United States Patent Office.

SAMUEL HUFTY, OF CAMDEN, NEW JERSEY, AND JOSEPH K. CALDWELL, OF PHILADELPHIA, PENNSYLVANIA.

IRON CASTING.

SPECIFICATION forming part of Letters Patent No. 614,427, dated November 15, 1898.

Application filed September 4, 1897. Serial No. 650,674. (No specimens.)

*To all whom it may concern:*

Be it known that we, SAMUEL HUFTY, of Camden, New Jersey, and JOSEPH K. CALDWELL, of Philadelphia, Pennsylvania, citizens of the United States, have invented an Improved Iron Casting, of which the following is a specification.

Our invention consists of an improved form of iron casting which is highly tenacious, soft, malleable, and easily machined, is capable of being readily forged and welded, and is susceptible of hardening or tempering in either oil or water, such castings being not only applicable for all purposes for which castings of iron are generally used, but also for many purposes for which steel castings or even steel forgings are now employed.

The castings in the first instance may be composed of any ordinary white cast-iron suitable for the production of malleable-iron castings, although it is preferable that the iron should contain some free carbon and a considerable percentage of silicon, an iron which, after melting, contains about the following proportions of combined carbon, graphite, manganese, silicon, sulfur, and phosphorus being suggested as the preferable one from which to make the original castings: combined carbon, 2.75; graphite, .50; manganese, .150; silicon, .750; sulfur, .020; phosphorus, .015.

The castings are placed in a furnace in which they can be raised to and maintained at a high temperature, and for this purpose we can use any form of furnace in which the flow of air and of the products of combustion is susceptible of regulation.

It is well known that the three states in which matter is cognizable—namely, the gaseous, the liquid, and the solid—differ from each other merely in the closeness of their molecular aggregation. In other words, solidification is merely the union of molecules of a simple type—that is to say, the gaseous or liquid type—into a more complex molecular aggregation. It is also well known that the molecular aggregations of all substances, even the most dense, are in constant motion, this molecular motion in very dense solids, however, being restricted to a mere oscillation about a mean central position, so that the configuration of the molecular aggregates remains nearly constant.

The density of the bodies, and consequently the greater or less freedom of motion among their molecular aggregates, is merely a function of temperature and pressure, density decreasing and freedom of motion increasing as the temperature increases until a temperature is reached at which the body becomes soluble, although not necessarily liquid.

When the body becomes soluble, the molecular aggregates are capable of dissociation and become free to rearrange themselves in accordance with the tendencies or accidents of their composition, and do so rearrange themselves—that is to say, chemical reaction takes place and the making and remaking of molecular aggregates goes on until a final arrangement is reached, this final arrangement depending upon such accidents as the predominance of some particular constituent, the temperature at which the change takes place, the pressure under which it takes place, or the rate of cooling.

Liquefaction is but an accident of solution and not an indispensable quality of it, both liquidity and solidity being only special states of solution, dependent wholly upon temperature and pressure, the true characteristics of solubility being dissociation and rearrangement of molecular aggregates, which often takes place in solids at temperatures far below that at which liquefaction occurs, though the temperature at which the dissociation takes place is determined by pressure.

In white cast-iron the aggregation of the combined iron and carbon molecules is extremely close, as indicated by the density of the iron, and in the treatment of such iron for the purpose of carrying out our invention we subject it to a temperature at which the two solids, iron and carbon, become soluble in each other, this temperature being much below the point of liquefaction, but being continued for a considerable time. The compound molecular aggregates being dissociated into simpler molecular forms, and these again into their atomic constituents, the atoms rearrange themselves into new molecular aggregates, the final arrangement being the permanent separation of the greater portion of the combined iron and carbon, while the pressure under which the dissociation takes place prevents the free carbon from passing into higher complex molecular aggregates—that is to say, the pressure compels the carbon to remain in its simplest form of atomic aggregation and restricts the physical dimensions of the carbon molecules, which are in an amorphous condition and hence distinguished from the graphite of cast-iron. This amorphous condition is evidenced by the fact, demonstrated by analytical tests, that the carbon in our castings has a specific gravity of about one and eight-tenths (1.8), a calorific power of about eight thousand (8,000) heat-units, and a specific heat of about twenty-four hundred ten-thousandths (.2400), and therefore answers the conditions which are recognized as distinguishing amorphous carbon. The exact figures of the specific analysis referred to are as follows: Carbon obtained from a casting treated in accordance with our invention was found to have a specific gravity of one and eight-tenths (1.8) as compared with water, whereas the specific gravity of graphite obtained from cast-iron is, as is well known, from two and two-tenths (2.2) to two and four-tenths (2.4) and the specific gravity of amorphous carbon from one and six-tenths (1.6) to two (2). The calorific power of one gram of the carbon obtained from our casting was determined by calorimeter test to be seven thousand nine hundred and ninety-six heat-units, whereas the calorific power of graphite obtained from cast-iron is seven thousand seven hundred and seventy and that of amorphous carbon eight thousand and eighty heat-units. The specific heat of the carbon obtained from our casting was found to be .2397, whereas the specific heat of graphite obtained from cast-iron is .2008 and that of amorphous carbon .2415. The character of the carbon in different castings made in accordance with our invention may, however, without materially affecting the drawing, welding, hardening, or tempering qualities of the same, vary to some extent in respect of specific gravity, calorific power, and specific heat, depending upon the varying character of the iron before treatment or other causes. Hence we do not wish to be understood as limiting ourselves to the specific figures before given. In all cases, however, the carbon, as to the properties named, resembles amorphous carbon and is as to said properties materially and demonstrably different from the graphite of cast-iron, whether the latter be ordinary or malleable cast-iron. The separation of the carbon in this peculiar manner is due to the temperature and pressure under which the separation takes place, the pressure within the solid at the temperature of treatment being many times greater than that at which the dissociation of the combined iron and carbon molecular aggregates takes place in molten iron, and the change taking place during a rise of temperature or during a long continued stationary or substantially stationary temperature, while in ordinary gray cast-iron the changes takes place during a fall of temperature and in a short space of time.

In producing iron castings in accordance with our invention the carbon passes from a combined into an amorphous graphitic state little by little, the action proceeding gradually throughout the mass during the continuance of the treatment. The molecular changes take place without any marked deformation of the physical shape of the castings, although small changes in physical form generally occur and are apparent in altered density of the body.

In preparing iron castings in accordance with our invention we find it sufficient in most cases to raise their temperature to about fifteen hundred degrees (1,500°) Fahrenheit and to continue the treatment for about two hours, although a higher temperature and a longer treatment may be required where the original white-iron castings are of a particularly dense character.

As indicating the difference between an iron casting produced in accordance with our invention and the ordinary white-iron casting from which it is made, we append analyses showing the respective proportions of combined carbon, graphite, manganese, silicon, sulfur, and phosphorus in two samples, analysis No. 1 being of the iron before treatment and analysis No. 2 of similar iron after treatment:

|  | No. 1. | No. 2. |
|---|---|---|
| Combined carbon | 2.96 | .73 |
| Graphite | .48 | 2.71 |
| Manganese | .136 | .104 |
| Silicon | .903 | .837 |
| Sulfur | .208 | .172 |
| Phosphorus | .084 | .080 |

While iron castings produced in accordance with our invention may be considered a special form of gray cast-iron in which the graphite is in an allotropic but not identical form with that in gray iron, such castings possess so many unique physical qualities that they are considered a new commercial product standing midway between iron and steel and uniting in themselves the best characteristics of both.

Castings in accordance with our invention have none of the characteristics of white cast-iron, but in their stead the specific gravity and softness of gray iron, together with the malleability and susceptibility to forging and welding which are characteristic of soft steel, the strength and tenacity of a steel casting, and the hardening and tempering properties of high-carbon steel, this hardening and tempering quality, which marks the difference between castings of our invention and ordinary iron or steel castings, being a peculiar characteristic, which renders castings made in accordance with our invention suitable for a large number of purposes for which expensive high-carbon steels are now employed. As indicative of this we may say that the treated sample No. 2, before referred to, was softer than soft steel, presented a soft and mossy fracture in which the graphite was quite apparent, could be plated out while cold to double its original size, was drawn out into a file-tang, made a sound weld at full yellow heat, hardened in both oil and water, and could be made to take temper by color, while its tensile strength was increased from about sixteen thousand pounds to the square inch in the original white-iron casting to about fifty-seven thousand pounds to the square inch in the treated casting.

The existence of carbon in the treated iron in the free or graphitic state greatly adds to its durability for all purposes where friction plays a part, and hence renders the castings of especial value for the manufacture of gear-wheels or other parts of machinery subjected to excessive friction.

Having thus described our invention, we claim and desire to secure by Letters Patent—

1. A casting of iron susceptible of being drawn, welded, hardened or tempered, and containing throughout its mass allotropic carbon in amorphous condition and having a specific gravity of about one and eight-tenths (1.8), a calorific power of about eight thousand (8,000) heat-units, and a specific heat of about twenty-four hundred ten-thousandths (.2400).

2. A casting of iron susceptible of being drawn, welded, hardened or tempered, and containing throughout its mass allotropic carbon in amorphous condition and in excess of two per cent., said carbon having a specific gravity of about one and eight-tenths (1.8), a calorific power of about eight thousand (8,000) heat-units, and a specific heat of about twenty-four hundred ten-thousandths (.2400).

3. A casting of iron susceptible of being drawn, welded, hardened or tempered, and containing throughout its mass allotropic carbon in amorphous condition and much in excess of the combined carbon, and having a specific gravity of about one and eight-tenths (1.8), a calorific power of about eight thousand (8,000) heat-units, and a specific heat of about twenty-four hundred ten-thousandths (.2400).

In testimony whereof we have signed our names to this specification in the presence of two subscribing witnesses.

SAMUEL HUFTY.
JOSEPH K. CALDWELL.

Witnesses:
FRANK E. BECHTOLD,
JOS. H. KLEIN.